(12) United States Patent
Kawahara et al.

(10) Patent No.: US 6,653,400 B2
(45) Date of Patent: Nov. 25, 2003

(54) METHOD FOR PRODUCING SAPONIFIED ETHYLENE-VINYL ACETATE COPOLYMER

(75) Inventors: Takaharu Kawahara, Okayama (JP); Toshio Tuboi, Okayama (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/892,694

(22) Filed: Jun. 28, 2001

(65) Prior Publication Data

US 2002/0037971 A1 Mar. 28, 2002

(30) Foreign Application Priority Data

Jun. 29, 2000 (JP) ......................................... 2000-195496

(51) Int. Cl.⁷ ................................................. C08F 8/00
(52) U.S. Cl. ...................... 525/61; 210/348; 210/360.1; 210/780; 210/781; 525/57; 525/60; 525/62; 525/330.6
(58) Field of Search ................ 525/60, 61, 62, 525/330.6, 57; 270/780, 781, 348, 360.1

(56) References Cited

U.S. PATENT DOCUMENTS

| | | | | |
|---|---|---|---|---|
| 2,227,997 A | * | 1/1941 | Berg ............................. | 525/62 |
| 2,266,996 A | * | 12/1941 | Scott et al. .................... | 525/62 |
| 2,386,347 A | * | 10/1945 | Roland ........................ | 101/456 |
| 3,290,363 A | * | 12/1966 | Saito et al. ................... | 560/248 |
| 3,510,464 A | * | 5/1970 | Sato .............................. | 525/60 |
| 3,523,933 A | * | 8/1970 | Inskip .......................... | 525/56 |
| 3,541,069 A | * | 11/1970 | Bristol et al. .................. | 525/62 |
| 3,544,538 A | * | 12/1970 | Masuda et al. ................ | 525/62 |
| 3,847,845 A | | 11/1974 | Tada et al. | |
| 3,985,719 A | * | 10/1976 | Hoyt et al. ................... | 525/62 |
| 4,485,225 A | | 11/1984 | Satoh et al. | |
| 5,292,804 A | * | 3/1994 | Chen ............................ | 525/62 |
| 5,744,547 A | | 4/1998 | Moritani et al. | |
| 5,866,655 A | | 2/1999 | Fujiwara et al. | |
| 6,288,165 B1 | | 9/2001 | Moritani et al. | |

FOREIGN PATENT DOCUMENTS

| | | |
|---|---|---|
| GB | 1302286 | 1/1973 |
| JP | 47-38634 | 9/1972 |
| JP | 1-52404 | 11/1989 |
| JP | 9-71620 | 3/1997 |
| JP | 10-158325 | 6/1998 |
| JP | 11-209435 | 8/1999 |

OTHER PUBLICATIONS

JP 70034152 1970, Month is not available.*

* cited by examiner

Primary Examiner—Judy M. Reddick
(74) Attorney, Agent, or Firm—Oblon, Spivak, McClelland, Maier & Neustadt, P.C.

(57) ABSTRACT

This invention provides a method for producing a saponified ethylene-vinyl acetate copolymer in which visible imperfections (particularly fish eyes) of the saponified copolymer is inhibited. In this invention, a mixture solution is prepared by adding water to a methanol solution after saponifying an ethylene-vinyl acetate copolymer, and insoluble materials are removed from this mixture solution. Various types of filter or centrifugal separator are used to remove insoluble materials. It is preferable that the weight ratio of methanol to water is from 5:5 to 9:1, the concentration of the saponified copolymer is from 30 to 60 wt %, and the temperature is from 55 to 80° C. This method is particularly suitable for producing a saponified ethylene-vinyl acetate copolymer having an ethylene content of 20 to 70 mol % and a saponification degree of at least 95 mol %.

20 Claims, No Drawings

METHOD FOR PRODUCING SAPONIFIED ETHYLENE-VINYL ACETATE COPOLYMER

FIELD OF THE INVENTION

The present invention relates to a method for producing a saponified ethylene-vinyl acetate copolymer (hereinafter referred to as "EVOH").

BACKGROUND OF THE INVENTION

An EVOH is excellent in melt moldability, gas barrier properties, water resistance, oil resistance, antistatic property and mechanical strength, and are used as various types of packages in the form of a film, a sheet, a container or the like. In these packages, visible imperfections generated at the time of molding, e.g. fish eyes, are significant problems that need to be addressed. Thus, traditionally, to inhibit the above-mentioned visible imperfections, various improvements in the process of producing an EVOH have been proposed.

For example, JP 1(1989)-52404B discloses a method including a step of copolymerizing ethylene and vinyl acetate, in which the ratio of the average residence time within a polymerization vessel with respect to the half value period of a polymerization initiator is not less than a fixed coefficient, which is determined from the polymerization degree of vinyl acetate. This method can be realized by using a polymerization initiator having a short half-life.

Furthermore, for example, JP 9(1997)-71620A discloses a method in which a conjugated polyene compound is added after copolymerizing ethylene and vinyl acetate, and further unreacted materials are removed. Also, JP 10(1998)-158325A discloses a method in which a thiol compound is added after copolymerizing ethylene and vinyl acetate, and further unreacted materials are removed.

DISCLOSURE OF THE INVENTION

It is therefore desirable to add further improvements to the methods for producing EVOH, thereby inhibiting visible imperfections in molded EVOH products more effectively.

The inventors have found that appearances of an EVOH molded product can be improved by preparing a mixture solution (mixed solvent) of methanol and water after saponification, and removing insoluble materials from this solution.

That is, the present invention provides a method for producing an EVOH, which method includes: copolymerizing ethylene and vinyl acetate in a methanol solution to form an ethylene-vinyl acetate copolymer; saponifying the copolymer in a methanol solution; adding water to the methanol solution containing the copolymer saponified, thereby to prepare a solution; removing insoluble materials from the solution; and obtaining the EVOH from the mixture solution from which the insoluble materials have been removed.

In the method of the present invention, foreign materials included, and insoluble components formed as by-products in various steps such as copolymerizing ethylene and vinyl acetate, removing (recovering) unreacted materials, saponifying the copolymer and the like are removed after saponification. Thus, the concentration of agents causing visible imperfections in a molded product can be reduced, regardless of which steps caused their introduction.

In the method of the present invention, it is preferable that the insoluble materials are removed from the mixture solution in which the ratio of methanol and water is in the range of 5:5 to 9:1 by weight. This makes it easy to remove the insoluble materials that will cause defective appearances while the EVOH is dissolved.

The method of the present invention is suitable for obtaining an EVOH having an ethylene content of at least 20 mol % but not more than 70 mol % and a saponification degree of at least 95 mol %.

In the method of the present invention, it is preferable that the insoluble materials are removed from the mixture solution in which the concentration of the EVOH is at least 30 wt % but not more than 60 wt %. When the concentration is too low, it may be disadvantageous in terms of cost. Conversely, when the concentration is too high, the viscosity of the mixture solution may increase, resulting in difficult filtration.

Furthermore, it is preferable that the insoluble materials are removed from the mixture solution in which the temperature of the mixture solution is at least 55° C. but not higher than 80° C. When the temperature is too low, the viscosity of the mixture solution may increase, resulting in difficult filtration. Conversely, when the temperature is too high, the mixture solution may foam or discolor.

In the above method, it is preferable that at least a part of the insoluble materials is a polyvinyl alcohol having a saponification degree of at least 95 mol % and/or an EVOH having an ethylene content of not more than 10 mol % and a saponification degree of at least 95 mol %. A polyvinyl alcohol (PVA) as a homopolymer of vinyl acetate, or an EVOH containing ethylene but having a low ethylene content such as the above and having a high saponification degree (hereinafter may be referred to as "a low ethylene EVOH") causes a molded product to form as a gel. Thus, by removing PVA and/or a low ethylene EVOH from the mixture solution, the appearance characteristics of an intended EVOH molded product can be improved.

DESCRIPTION OF THE PREFERRED EMBODIMENT

In the following, a preferred embodiment of the present invention is described.

In the present invention, a mixture solution is prepared by adding water to a methanol solution of an EVOH obtained by saponifying an ethylene-vinyl acetate copolymer. The form of the water added is not critical, and for example, it may be added in the form of water vapor. The insoluble materials in the mixture solution thus prepared are removed by solid-liquid separation such as filtration or centrifugal separation.

Particularly, PVA and/or low ethylene EVOH contained in the methanol solution after saponification should be removed to prevent deterioration of the appearance of an EVOH molded product. Therefore, the mixture ratio of water to methanol in the mixture solution may be in a range where the solubility of the intended EVOH is high and the solubility of PVA or a low ethylene EVOH is low.

The above-mentioned range of ratios depends on the ethylene content of the intended EVOH, copolymer concentration, solution temperature, etc. However, when producing an EVOH having an ethylene content of 20 to 70 mol % and a saponification degree of at least 95 mol %, approximately it is preferable that the weight ratio of methanol to water is from 5:5 to 9:1. When the amount of water added is too large, PVA and/or low ethylene EVOH are dissolved, and cannot be removed sufficiently as insoluble materials.

It is preferable that as the ethylene content in the EVOH increases, the content of methanol in the mixture solution also increases a little. For example, when the saponification degree is at least 95 mol %, the weight ratio of methanol to water when producing an EVOH having an ethylene content of 20 to 30 mol % is preferably from 5:5 to 7:3; the weight ratio of methanol to water when producing an EVOH having an ethylene content of 30 to 55 mol % is preferably from 6:4 to 8:2; and the weight ratio of methanol to water when producing an EVOH having an ethylene content of 55 to 70 mol % is preferably from 7:3 to 9:1.

It is generally preferable that the concentration of EVOH in the mixture solution prepared to remove insoluble materials is at least 30 wt % but not more than 60 wt %. Furthermore, it is generally preferable that the temperature of this mixture solution is at least 55° C. but not more than 80° C. There may be more preferable ranges for these concentration and temperature depending on the ethylene content in the intended EVOH etc.

The solid-liquid separation when removing insoluble materials from the mixture solution may be carried out using various types of filter or centrifugal separator. Insoluble materials can be removed efficiently, for example, when using at least one solid-liquid separation method selected from filtration with a plate filter, filtration with a bucket filter, filtration with a candle filter, and separation with a centrifugal separator. But when solid-liquid separation is carried out for a mixture solution containing an EVOH, filtration methods in which even a solution with high viscosity can be separated efficiently are preferred. Among these, filtration with a candle filter can give particularly efficient separation.

Although the filter used in filtration may be made of various materials, for example, when using a filter made of metal, it is preferable that a filter with apertures of about 20 to 100 μm is used. When the apertures are too large, insoluble materials may be included in the mixture solution. Conversely, when the apertures are too small, the filter pressure may be too high, and filtration may be difficult to carry out.

In the following, the ordered steps of an example of the method of the present invention will be described.

For the copolymerization of ethylene and vinyl acetate, any of solution polymerization, suspension polymerization, emulsion polymerization and bulk polymerization may be used, but solution polymerization is preferred. A method of either continuous type or batch type may be employed. Methanol is generally used as the solvent.

As a catalyst, any radical initiator may be used without particular limitation. Preferred catalysts are azonitrile-based initiators such as 2,2'-azobisisobutyronitrile, 2,2'-azobis-(2, 4-dimethylvaleronitrile), 2,2'-azobis-(4-methyl-2,4-dimethylvaleronitrile), 2,2'-azobis-(4-methoxy-2,4-dimethylvaleronitrile) and 2,2'-azobis-(2-cyclopropylpropionitrile); and organic peroxide-based initiators such as isobutyryl peroxide, cumyl peroxyneodecanoate, diisopropyl peroxycarbonate, di-n-propyl peroxydicarbonate, t-butyl peroxyneodecanoate, lauroyl peroxide, benzoyl peroxide and t-butyl hydroperoxide.

Monomers copolymerizable with ethylene and vinyl acetate also may be present together with ethylene and vinyl acetate. Such monomers include (i) α-olefins such as propylene, isobutylene, α-octene and α-dodecene; (ii) unsaturated acids such as acrylic acid, methacrylic acid, crotonic acid, maleic acid and itaconic acid, salts thereof, and anhydrides or mono- or dialkyl esters thereof; (iii) nitriles such as acrylonitrile and methacrylonitrile; (iv) amides such as acrylamide and methacrylamide; (v) olefin sulfonic acids such as ethylene sulfonic acid, allyl sulfonic acid and methallyl sulfonic acid, or salts thereof. Other monomers such as alkyl vinyl ethers, vinyl ketone, N-vinylpyrrolidone, vinyl chloride, vinylidene chloride and the like also may be present. However, it is preferable that these third monomers are added to such an extent that the effects of the present invention are not inhibited.

Considering the characteristics of EVOH, it is preferable that the ethylene content in the copolymer is at least 20 mol % but not more than 70 mol %. When the ethylene content is too low, sufficient water resistance cannot be obtained. Conversely, when the ethylene content is too high, sufficient gas barrier properties cannot be obtained. From these viewpoints, it is more preferable that the ethylene content is from 25 to 60 mol %. Moreover, when the copolymer is used as a coating material or the like, the ethylene content may be less than 20 mol %.

It is preferable that the polymerization temperature is at least 50° C. but not more than 80° C., and the pressure of the gaseous phase (ethylene pressure) in the polymerization vessel is from 1962 to 7848 kPa (20 to 80 kg/cm$^2$). In the case of batch type, it is preferable that the reaction time is from 3 to 24 hours. In the case of continuous type, it is also preferable that the average residence time is in about the same range. It is preferable that the polymerization degree is from about 30% to about 80%, based on vinyl acetate.

Subsequently, a polymerization inhibitor is added to a solution containing an ethylene-vinyl acetate copolymer (copolymer solution), and unreacted ethylene gas is evaporated and removed from the copolymer solution. Further, unreacted vinyl acetate is extracted from the copolymer solution. The vinyl acetate can be extracted, for example, by continuously feeding the copolymer solution into a column filled with Raschig ring through an upper portion thereof at a fixed rate, while continuously blowing a methanol vapor into the column through a lower portion thereof. By extracting vinyl acetate using such a recovery column, unreacted vinyl acetate can be taken out of the column through a top portion thereof with methanol vapor, and a copolymer solution from which unreacted vinyl acetate has been removed can be obtained through a bottom portion of the column.

The mixture solution taken out of the column through a top portion thereof includes unreacted vinyl acetate and methanol. This mixture solution is introduced into another recovery column, and vinyl acetate is separated and recovered from the mixture solution by extractive distillation with water. Furthermore, methanol is recovered by separating and purifying this water/alcohol mixture solution. The vinyl acetate and methanol thus recovered may be reused in the above-mentioned copolymerization.

An alkali catalyst is added to the copolymer solution from which unreacted vinyl acetate has been removed, and the acetic acid ester component of the ethylene-vinyl acetate copolymer is saponified. The saponification may be either a continuous type or a batch type method. As the alkali catalyst, sodium hydroxide, potassium hydroxide, alkali metal alcoholate or the like may be used. For example, when the saponification is carried out by a batch type method, it is preferable that the temperature of the copolymer solution is at least 30° C. but not more than 65° C., and the reaction time is from 1 to 6 hours. It is preferable that the concentration of the copolymer solution is from 10% to 50%, and the amount of the catalyst used is from 0.02 to 1.0 equivalents with respect to the acetic acid ester component.

It is preferable that the saponification degree of the EVOH is at least 95 mol %, more preferably at least 99 mol %. When the saponification is insufficient, sufficient gas barrier properties may not be obtained. Moreover, for example, in order to improve the interlayer adhesion or the like, the saponification degree also may be about 80 to 95 mol %. The EVOH with this saponification degree may be used alone, but it also may be used as a blend with an EVOH having a saponification degree of at least 99 mol %.

It is preferable that the melt index (MI) of the EVOH is from 0.1 to 200 g/10 min. As the MI, a measured value at 190° C. and under a load of 2160 g is used. However, with respect to an EVOH having a melting point of around 190° C. or exceeding 190° C., a plurality of measured values under the above-specified load and at temperatures of not less than the melting point are plotted as a semi-logarithmic graph with the inverse of the absolute temperature on the horizontal axis and MI on the vertical axis (logarithmic scale), and a value extrapolated at 190° C. is used as the MI.

When saponification is carried out as in the above, a methanol solution of an EVOH is obtained. In this methanol solution, other components that have been included, left, or formed as by-products in the above respective steps are present. Conventionally, plasticizers, stabilizers, surfactants, crosslinking agents, metal salts, fillers, reinforcing materials such as various types of fibers, and the like. may have been added to this methanol solution so as to neutralize remaining alkali catalyst or to improve the properties of the EVOH. However, the preparation of a mixture solution by adding water and solid-liquid separation to remove insoluble materials has not previously been carried out. By preparing the above-described mixture solution and removing insoluble materials from this mixture solution, generation of visible imperfections in the molded product can be inhibited.

After removing insoluble materials, the EVOH is molded into various forms such as films, sheets, containers, pipes, fibers and the like by melt molding. Melt molding may be effected by extrusion molding, inflation, blow molding, melt spinning, injection molding, etc. It is preferable that the melting temperature is from 150 to 270° C. A blend of at least two kinds of EVOH different in polymerization degree, ethylene content, saponification degree and the like may be melt molded. Furthermore, plasticizers, stabilizers, surfactants, crosslinking agents, metal salts, fillers, reinforcing agents such as various types of fibers, etc. may be added to the EVOH in advance.

A thermoplastic resin other than EVOH may be mixed with the EVOH. Examples of the thermoplastic resin include polyolefins (polyethylene, polypropylene, poly-1-butene, poly-4-methyl-1-pentene, ethylene-propylene copolymers, copolymers of ethylene and an a-olefin having at least 4 carbon atoms, copolymers of a polyolefin and maleic anhydride, ethylene-vinyl acetate copolymers, ethylene-acrylic acid ester copolymers, modified polyolefins in which these polyolefins are grafted with an unsaturated carboxylic acid or its derivative, etc.), various types of nylons (nylon 6, nylon 66, nylon 6/nylon 66 copolymers, etc.), polyvinyl chloride, polyvinylidene chloride, polyester, polystyrene, polyacrylonitrile, polyurethane, polyacetal, modified polyvinyl alcohol resin, and the like.

Furthermore, the EVOH may be formed into a laminate, for example, by coextruding the EVOH with a thermoplastic resin such as those exemplified above. Furthermore, the EVOH may be formed into a laminate with a substrate film such as paper, plastic film, metal foil or the like, and may be coated on the surface of these substrate films by coextrusion coating, solution coating or the like.

EXAMPLES

In the following, the present invention will be described in more detail with reference to the following non-limiting examples.

Example 1

100 weight parts of an ethylene-vinyl acetate copolymer having an ethylene content of 32 mol % and 400 weight parts of methanol were put in a saponification reactor, and 0.16 weight part of a methanol solution of sodium hydroxide (80 g/L) (sodium hydroxide/vinyl acetate units=0.4/1; molar ratio) was added. Nitrogen gas was blown into the reactor, and while removing the methyl acetate formed as a by-product out of the system with methanol, the reaction was carried out at 60° C. for 4 hours. The reaction was then stopped by neutralization with acetic acid, and a methanol solution of an EVOH comprising 57 weight parts of an EVOH and 75 weight parts of methanol was obtained. The saponification degree of this EVOH was 99.5 mol %.

Subsequently, 32 weight parts of water was added to prepare a methanol/water solution of EVOH. The ratio of methanol to water at this time was approximately 70:30 (weight ratio). This methanol/water solution of EVOH was drawn from the reactor through a bottom portion thereof with a gear pump while maintaining its temperature at 60° C., and supplied to a bucket filter. An element made of metal with apertures of 60 $\mu$m was arranged in a filtration part. After filtration, the material adhered to the element was sampled and analyzed by infrared spectroscopy. The results showed that the main component of the adhered material was PVA.

Furthermore, the EVOH solution filtered was extruded into water through a metal plate having circular apertures so as to coagulate in the form of strands. The strands were cut to obtain pellets with a diameter of about 3 mm and a length of about 5 mm. The pellets were deliquored by a centrifugal separator, and the operation of adding a large amount of water and deliquoring was repeated. The EVOH pellets thus obtained were dried with a fluidized drying oven at 80° C. for 15 hours, and further dried with a ventilation drying oven at 110° C. for 24 hours. Thus, dry pellets (water content of 0.3%) were obtained.

A single-layer film formation test was carried out for these dry pellets, using the extruder and T-die specified below:

| | |
|---|---|
| Extruder: | GT-40-A (manufactured by Research Laboratory of Plastics Technology Co., Ltd.) |
| Type: | Single screw extruder (non-vent type) |
| L/D: | 26 |
| CR: | 3.5 |
| Bore diameter: | 40 mm $\phi$ |
| Screw: | Single-start full-flight type, nitrided surface steel |
| Revolution: | 40 rpm |
| Driving machine: | Direct current electric motor SCR-DC218B, manufactured by Sumitomo Heavy industries, Ltd. |
| Motor capacity: | DC 7.5 KW (rated at 45 A) |
| Heater: | Four-division type |
| Die width: | 300 mm |
| Resin temperature within the die: | 240° C. |
| Rate of taking up: | 10 m/min |

The fish eyes (those having a diameter of about 100 $\mu$m or more, which can be confirmed with the naked eye) in the film one hour after the start of the film formation were counted, and converted into a number per 1.0 m$^2$.

According to the number of the fish eyes per 1.0 m$^2$, the appearance of the film was evaluated as follows:

A: less than 20

B: at least 20 but less than 100

C: at least 100 but less than 500

D: at least 500

The appearance of the film obtained in this example was A.

Example 2

Except that the filter was changed to a plate filter using a nonwoven fabric, saponification, filtration, pelletization and film formation were carried out in the same manner as in Example 1. For the film thus obtained, fish eyes were counted, and evaluation was made in the same manner as the above. As a result, the appearance of the film obtained was A.

Example 3

Except that 61 weight parts of water was added to the methanol solution of EVOH after saponifiation (the weight ratio of methanol to water was 55:45), saponification, filtration, pelletization and film formation were carried out in the same manner as in Example 1. For the film thus obtained, fish eyes were counted, and evaluation was made in the same manner as the above. As a result, the appearance of the film obtained was B.

Example 4

100 weight parts of an ethylene-vinyl acetate copolymer having an ethylene content of 41 mol % and 400 weight parts of methanol were put in a saponification reactor, and 0.24 weight part of a methanol solution of sodium hydroxide (80 g/L) (sodium hydroxide/vinyl acetate units=0.7/1; molar ratio) was added. Nitrogen gas was blown into the reactor, and while removing methyl acetate formed as a by-product out of the system with methanol, reaction was carried out at 60° C. for 4 hours. The reaction was then stopped by neutralization with acetic acid, and a methanol solution of an EVOH comprising of 60 weight parts of an EVOH and 83 weight parts of methanol was obtained. The saponification degree of this EVOH was 99.3 mol %.

Subsequently, 29 weight parts of water was added to prepare a methanol/water solution of EVOH. The ratio of methanol to water at this time was approximately 74:26 (weight ratio). This methanol/water solution of EVOH was drawn from the reactor through a bottom portion thereof with a gear pump while maintaining its temperature at 60° C., and supplied to a bucket filter. An element made of metal with apertures of 60 $\mu$m was arranged in a filtration part. After filtering the methanol/water solution of EVOH, the material adhered to the element was sampled and analyzed by infrared spectroscopy. The results showed that the main component of the adhered material was PVA.

Furthermore, the EVOH solution filtered was extruded into water through a metal plate having circular apertures so as to coagulate in the form of strands. The strands were cut to obtain pellets with a diameter of about 3 mm and a length of about 5 mm. The pellets were deliquored by a centrifugal separator, and the operation of adding a large amount of water and deliquoring was repeated. The EVOH pellets thus obtained were dried with a fluidized drying oven at 80° C. for 15 hours, and further dried with a ventilation drying oven at 110° C. for 24 hours. Thus, dry pellets (water content of 0.3%) were obtained.

Using the obtained pellets, film formation was carried out in the same manner as in Example 1. For the film thus obtained, fish eyes were counted, and evaluation was made in the same manner as the above. As a result, the appearance of the film obtained was A.

Example 5

100 weight parts of an ethylene-vinyl acetate copolymer having an ethylene content of 27 mol % and 400 weight parts of methanol were put in a saponification reactor, and 0.16 weight part of a methanol solution of sodium hydroxide (80 g/L) (sodium hydroxide/vinyl acetate units=0.37/1; molar ratio) was added. Nitrogen gas was blown into the reactor, and while removing methyl acetate formed as a by-product out of the system with methanol, reaction was carried out at 60° C. for 4 hours. The reaction was then stopped by neutralization with acetic acid, and a methanol solution of an EVOH comprising 56 weight parts of an EVOH and 98 weight parts of methanol was obtained. The saponification degree of this EVOH was 99.5 mol %.

Subsequently, 100 weight parts of water was added to prepare a methanol/water solution of EVOH. The ratio of methanol to water at this time was approximately 49:51 (weight ratio). This methanol/water solution of EVOH was drawn from the reactor through a bottom portion thereof with a gear pump while maintaining its temperature at 60° C., and supplied to a bucket filter. An element made of metal with apertures of 60 cam was arranged in a filtration part. After filteration, the material adhered to the element was sampled and analyzed by infrared spectroscopy. The results showed that the main component of the adhered material was PVA.

Furthermore, the EVOH solution filtered was extruded into water through a metal plate having circular apertures so as to coagulate in the form of strands. The strands were cut to obtain pellets with a diameter of about 3 mm and a length of about 5 mm. The pellets were deliquored by a centrifugal separator, and the operation of adding a large amount of water and deliquoring was repeated. The EVOH pellets thus obtained were dried with a fluidized drying oven at 80° C. for 15 hours, and further dried with a ventilation drying oven at 110° C. for 24 hours. Thus, dry pellets (water content of 0.3%) were obtained.

Using the obtained pellets, film formation was carried out in the same manner as in Example 1. For the film thus obtained, fish eyes were counted, and evaluation was made in the same manner as the above. As a result, the appearance of the film obtained was C.

COMPARATIVE EXAMPLE

Except that the filtration with a bucket filter was not carried out, saponification, filtration, pelletization and film formation were carried out in the same manner as in Example 1. For the film thus obtained, fish eyes were counted, and evaluation was made in the same manner as the above. As a result, the appearance of the film obtained was D.

The results of the above examples and comparative examples are summarized in Table 1.

TABLE 1

| | Ethylene Content | Methanol/water* | filter | fish eye |
|---|---|---|---|---|
| Example 1 | 32 | 70:30 | Bucket type | A |
| Example 2 | 32 | 70:30 | Plate type | A |

TABLE 1-continued

|  | Ethylene Content | Methanol/water* | filter | fish eye |
|---|---|---|---|---|
| Example 3 | 32 | 55:45 | Bucket type | B |
| Example 4 | 41 | 74:26 | Bucket type | A |
| Example 5 | 27 | 49:51 | Bucket type | C |
| Comp. Example | 32 | 70:30 | No filter | D |

*Methanol/water indicates the weight ratio of methanol to water in the solution at the time of filtration.

As described above, according to the present invention, by preparing a mixture solution of methanol and water after saponification and removing insoluble materials from this mixture solution, the appearance of an EVOH molded product can be improved. Particularly, according to the present invention, because the insoluble materials generated in all the steps before melt molding can be removed collectively, a significant improvement in appearance can be obtained.

Finally, it is understood that the invention may be embodied in other specific forms without departing from the spirit or essential characteristics thereof. The embodiments disclosed in this application are to be considered in all respects as illustrative and not restrictive, so that the scope of the invention being indicated by the appended claims rather than by the foregoing description, and all changes which come within the meaning and range of equivalency of the claims are intended to be embraced therein.

What is claimed is:

1. A method for producing a saponified ethylene-vinyl acetate copolymer, which method comprises:
   copolymerizing ethylene and vinyl acetate in a methanol solution to form an ethylene-vinyl acetate copolymer;
   saponifying the copolymer in a methanol solution, to obtain a saponified copolymer;
   after the saponifying, adding water to the methanol solution containing the saponified copolymer, thereby to prepare a mixture solution;
   removing insoluble materials from the mixture solution; and
   obtaining the saponified ethylene-vinyl acetate copolymer from the mixture solution from which the insoluble materials have been removed;
   wherein at least a part of the insoluble materials is at least one selected from the group consisting of polyvinyl alcohol having a saponification degree of at least 95 mol % and a saponified ethylene-vinyl acetate copolymer having an ethylene content of not more than 10 mol % and a saponification degree of at least 95 mol %.

2. The method according to claim 1, wherein the mixture solution is an aqueous methanol solution with a ratio of methanol to water in the range of 5:5 to 9:1 by weight.

3. The method according to claim 1, wherein the saponified ethylene-vinyl acetate copolymer obtained has an ethylene content of at least 20 mol % but not more than 70 mol % and a saponification degree of at least 95 mol %.

4. The method according to claim 1, wherein the insoluble materials are removed from the mixture solution in which the concentration of the saponified copolymer is between 30 wt % and 60 wt %.

5. The method according to claim 1, wherein the insoluble materials are removed from the mixture solution at a temperature between 55° C. and 80° C.

6. A method for producing a saponified ethylene-vinyl acetate copolymer, which method comprises:
   copolymerizing ethylene and vinyl acetate in a methanol solution to form an ethylene-vinyl acetate copolymer;
   saponifying the copolymer in a methanol solution, to obtain a saponified copolymer;
   after the saponifying, adding water to the methanol solution containing the saponified copolymer, thereby to prepare a mixture solution;
   removing insoluble materials from the mixture solution; and
   obtaining the saponified ethylene-vinyl acetate copolymer from the mixture solution from which the insoluble materials have been removed,
   wherein the insoluble materials are removed from the mixture solution in which a ratio of methanol to water is in the range of 5:5 to 9:1 by weight; and
   the saponified ethylene-vinyl acetate copolymer obtained has an ethylene content of at least 20 mol % but not more than 70 mol % and a saponification degree of at least 95 mol %;
   wherein at least a part of the insoluble materials is at least one selected from the group consisting of polyvinyl alcohol having a saponification degree of at least 95 mol % and a saponified ethylene-vinyl acetate copolymer having an ethylene content of not more than 10 mol % and a saponification degree of at least 95 mol %.

7. The method according to claim 1, wherein the insoluble materials are removed by a filter or centrifugal separator.

8. The method according to claim 1, wherein the insoluble materials are removed with at least one solid-liquid separation method selected from the group consisting of filtration with a plate filter, filtration with a bucket filter, filtration with a candle filter, and separation with a centrifugal separator.

9. The method according to claim 1, wherein the insoluble materials are removed by candle filter.

10. The method according to claim 1, wherein prior to adding the water, the saponification is stopped by neutralization with acetic acid.

11. The method according to claim 1, further comprising molding the saponified ethylene-vinyl acetate copolymer into a form by melt-molding.

12. The method according to claim 1, further comprising mixing the saponified ethylene-vinyl acetate copolymer with a thermoplastic resin other than the saponified ethylene-vinyl acetate copolymer.

13. The method according to claim 1, further comprising forming the saponified ethylene-vinyl acetate copolymer into a laminate by a method selected from the group consisting of coextruding, coextrusion coating, and solution coating.

14. The method according to claim 6, wherein the insoluble materials are removed by a filter or centrifugal separator.

15. The method according to claim 6, wherein the insoluble materials are removed with at least one solid-liquid separation method selected from the group consisting of filtration with a plate filter, filtration with a bucket filter, filtration with a candle filter, and separation with a centrifugal separator.

16. The method according to claim 6, wherein the insoluble materials are removed by candle filter.

17. The method according to claim 6, wherein prior to adding the water, the saponification is stopped by neutralization with acetic acid.

18. The method according to claim 6, further comprising molding the saponified ethylene-vinyl acetate copolymer into a form by melt-molding.

19. The method according to claim 6, further comprising mixing the saponified ethylene-vinyl acetate copolymer with a thermoplastic resin other than the saponified ethylene-vinyl acetate copolymer.

20. The method according to claim 6, further comprising forming the saponified ethylene-vinyl acetate copolymer into a laminate by a method selected from the group consisting of coextruding, coextrusion coating, and solution coating.

* * * * *